(12) United States Patent
Willis et al.

(10) Patent No.: US 7,071,909 B2
(45) Date of Patent: Jul. 4, 2006

(54) REDUCING SPARKLE ARTIFACTS WITH LOW BRIGHTNESS PROCESSING

(75) Inventors: Donald Henry Willis, Indianapolis, IN (US); John Alan Hague, Indianapolis, IN (US)

(73) Assignee: Thomson Licensing, Boulogne-Billancourt (FR)

(*) Notice: Subject to any disclaimer, the term of this patent is extended or adjusted under 35 U.S.C. 154(b) by 613 days.

(21) Appl. No.: 09/803,249

(22) Filed: Mar. 9, 2001

(65) Prior Publication Data

US 2002/0126080 A1    Sep. 12, 2002

(51) Int. Cl.
    *G09G 3/28*    (2006.01)
(52) U.S. Cl. .................. 345/89; 345/213; 345/690
(58) Field of Classification Search ............... 345/213, 345/214, 87–89, 690; 348/447, 90, 597, 348/790, 572; 382/261
    See application file for complete search history.

(56) References Cited

U.S. PATENT DOCUMENTS

| | | | | |
|---|---|---|---|---|
| 4,499,497 A | | 2/1985 | Levine | 358/213 |
| 4,523,230 A | * | 6/1985 | Carlson et al. | 348/623 |
| 4,799,105 A | | 1/1989 | Mitchell et al. | 358/160 |
| 4,855,831 A | * | 8/1989 | Miyamoto et al. | 348/597 |
| 5,019,904 A | | 5/1991 | Campbell | 358/140 |
| 5,247,169 A | | 9/1993 | Okada et al. | 250/226 |
| 5,361,094 A | | 11/1994 | Jang | 348/254 |
| 5,417,221 A | * | 5/1995 | Sickler | 600/509 |
| 5,442,407 A | | 8/1995 | Iu | 348/620 |
| 5,589,880 A | | 12/1996 | Tsuki | 348/229 |
| 5,936,621 A | * | 8/1999 | Medin et al. | 345/213 |
| 5,978,047 A | | 11/1999 | May | 348/616 |
| 6,181,368 B1 | | 1/2001 | Takahashi et al. | 348/65 |
| 6,208,327 B1 | * | 3/2001 | Ho et al. | 345/690 |
| 6,219,101 B1 | * | 4/2001 | Sani et al. | 348/447 |
| 6,246,389 B1 | | 6/2001 | Timm | 345/440.1 |
| 6,347,161 B1 | * | 2/2002 | Mancuso | 382/261 |
| 6,359,663 B1 | * | 3/2002 | Gadeyne et al. | 348/790 |
| 6,429,904 B1 | * | 8/2002 | Sani et al. | 348/572 |
| 6,483,447 B1 | * | 11/2002 | Eglit | 341/111 |

FOREIGN PATENT DOCUMENTS

| | | | |
|---|---|---|---|
| EP | 457497 A2 | * | 11/1991 |
| JP | 808870 | | 1/1906 |

OTHER PUBLICATIONS

Anil C. Kokaram, Interpolation of Missing Data in Image Sequences, IEEE Transactions on Image Processing, vol. 4, No. 11, Nov. 1995, 1509-1519.*

Anil C. Kokaram, Detection of Missing Data in Image Sequences, IEEE Transactions on Image Processing, vol. 4, No. 11, Nov. 1995, 1496-1508.*

* cited by examiner

*Primary Examiner*—Amr A. Awad
(74) *Attorney, Agent, or Firm*—Joseph S. Tripoli; Harvey D. Fried; Christine Johnson

(57) ABSTRACT

A method for reducing sparkle artifacts in a liquid crystal imager, comprises the steps of: low pass filtering only a first lower brightness level signal component of a video signal; and, slew rate limiting only a second lower brightness level signal component of the video signal having the low pass filtered signal component, the video signal having the low pass filtered and the slew rate limited signal components being less likely to result in sparkle artifacts in the imager. Brightness thresholds for defining the lower brightness level signal components and slew rate limits can be selected in accordance with transitions between lower and higher level gain portions of a gamma table associated with the imager, for example an LCOS imager.

24 Claims, 4 Drawing Sheets

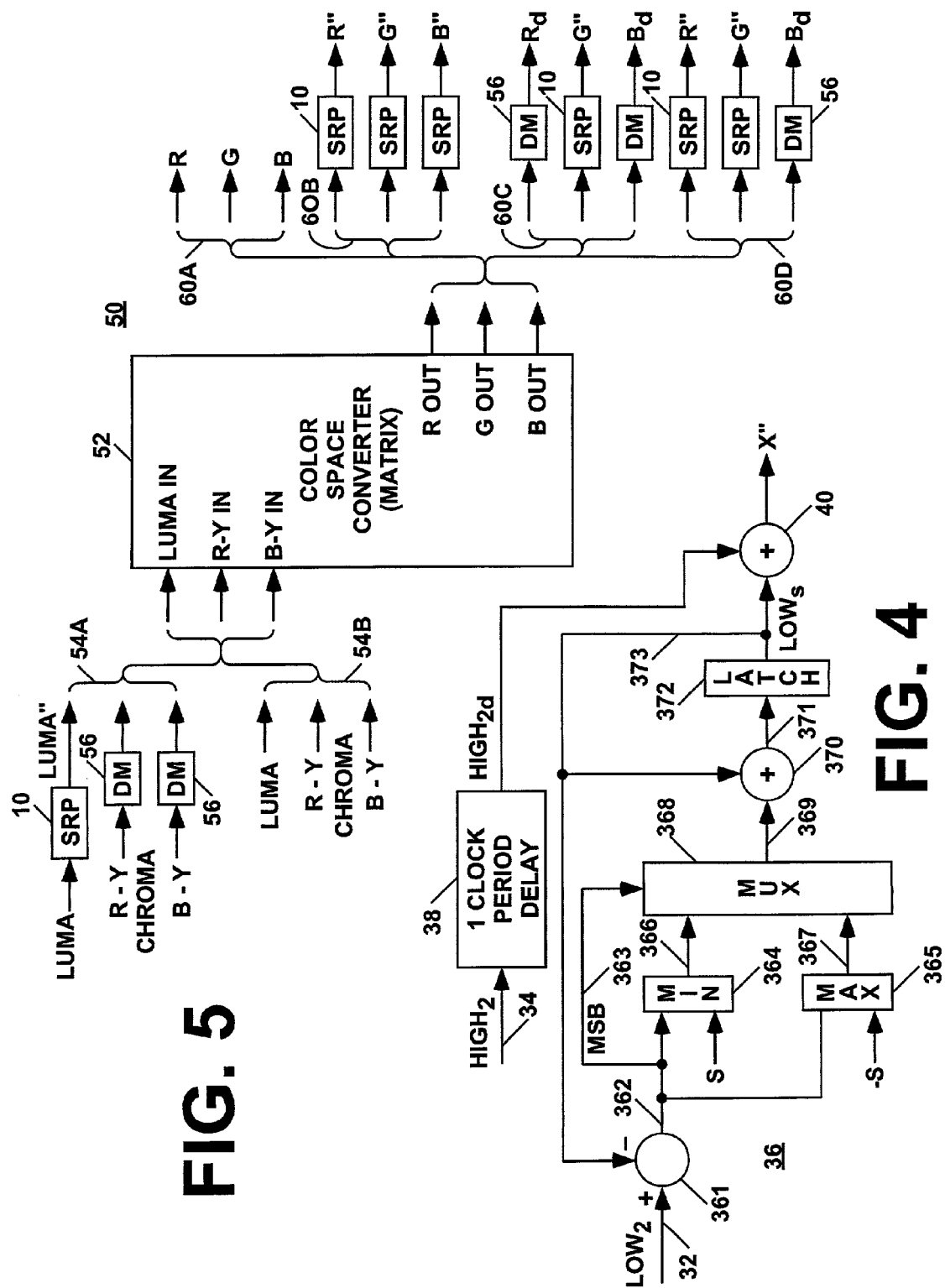

REDUCING SPARKLE ARTIFACTS WITH LOW BRIGHTNESS PROCESSING

BACKGROUND OF THE INVENTION

1. Field of the Invention

This invention relates to the field of video systems utilizing a liquid crystal display (LCD), and in particular, to video systems utilizing normally white liquid crystal on silicon imagers.

2. Description of Related Art

Liquid crystal on silicon (LCOS) can be thought of as one large liquid crystal formed on a silicon wafer. The silicon wafer is divided into an incremental array of tiny plate electrodes. A tiny incremental region of the liquid crystal is influenced by the electric field generated by each tiny plate and the common plate. Each such tiny plate and corresponding liquid crystal region are together referred to as a cell of the imager. Each cell corresponds to an individually controllable pixel. A common plate electrode is disposed on the other side of the liquid crystal. Each cell, or pixel, remains lighted with the same intensity until the input signal is changed, thus acting as a sample and hold. The pixel does not decay, as is the case with the phosphors in a cathode ray tube. Each set of common and variable plate electrodes forms an imager. One imager is provided for each color, in this case, one imager each for red, green and blue.

It is typical to drive the imager of an LCOS display with a frame-doubled signal to avoid 30 Hz flicker, by sending first a normal frame (positive picture) and then an inverted frame (negative picture) in response to a given input picture. The generation of positive and negative pictures ensures that each pixel will be written with a positive electric field followed by a negative electric field. The resulting drive field has a zero DC component, which is necessary to avoid the image sticking, and ultimately, permanent degradation of the imager. It has been determined that the human eye responds to the average value of the brightness of the pixels produced by these positive and negative pictures.

The drive voltages are supplied to plate electrodes on each side of the LCOS array. In the presently preferred LCOS system to which the inventive arrangements pertain, the common plate is always at a potential of about 8 volts. This voltage can be adjustable. Each of the other plates in the array of tiny plates is operated in two voltage ranges. For positive pictures, the voltage varies between 0 volts and 8 volts. For negative pictures the voltage varies between 8 volts and 16 volts.

The light supplied to the imager, and therefore supplied to each cell of the imager, is field polarized. Each liquid crystal cell rotates the polarization of the input light responsive to the root mean square (RMS) value of the electric field applied to the cell by the plate electrodes. Generally speaking, the cells are not responsive to the polarity (positive or negative) of the applied electric field. Rather, the brightness of each pixel's cell is generally only a function of the rotation of the polarization of the light incident on the cell. As a practical matter, however, it has been found that the brightness can vary somewhat between the positive and negative field polarities for the same polarization rotation of the light. Such variation of the brightness can cause an undesirable flicker in the displayed picture.

In this embodiment, in the case of either positive or negative pictures, as the field driving the cells approaches a zero electric field strength, corresponding to 8 volts, the closer each cell comes to white, corresponding to a full on condition. Other systems are possible, for example where the common voltage is set to 0 volts. It will be appreciated that the inventive arrangements taught herein are applicable to all such positive and negative field LCOS imager driving systems.

Pictures are defined as positive pictures when the variable voltage applied to the tiny plate electrodes is less than the voltage applied to the common plate electrode, because the higher the tiny plate electrode voltage, the brighter the pixels. Conversely, pictures are defined as negative pictures when the variable voltage applied to the tiny plate electrodes is greater than the voltage applied to the common plate electrode, because the higher the tiny plate electrode voltage, the darker the pixels. The designations of pictures as positive or negative should not be confused with terms used to distinguish field types in interlaced video formats.

The present state of the art in LCOS requires the adjustment of the common-mode electrode voltage, denoted $V_{ITO}$, to be precisely between the positive and negative field drive for the LCOS. The subscript ITO refers to the material indium tin oxide. The average balance is necessary in order to minimize flicker, as well as to prevent a phenomenon known as image sticking.

A light engine having an LCOS imager has a severe non-linearity in the display transfer function, which can be corrected by a digital lookup table, referred to as a gamma table. The gamma table corrects for the differences in gain in the transfer function. Notwithstanding this correction, the strong non-linearity of the LCOS imaging transfer function for a normally white LCOS imager means that dark areas have a very low light-versus-voltage gain. Thus, at lower brightness levels, adjacent pixels that are only moderately different in brightness need to be driven by very different voltage levels. This produces a fringing electrical field having a component orthogonal to the desired field. This orthogonal field produces a brighter than desired pixel, which in turn can produce undesired bright edges on objects. The presence of such orthogonal fields is denoted disclination. The image artifact caused by disclination and perceived by the viewer is denoted sparkle. The areas of the picture in which disclination occurs appear to have sparkles of light over the underlying image. In effect, dark pixels affected by disclination are too bright, often five times as bright as they should be. Sparkle comes in red, green and blue colors, for each color produced by the imagers. However, the green sparkle is the most evident when the problem occurs. Accordingly, the image artifact caused by disclination-is also referred to as the green sparkle problem.

LCOS imaging is a new technology and green sparkle caused by disclination is a new kind of problem. Various proposed solutions by others include signal processing the entire luminance component of the picture, and in so doing, degrade the quality of the entire picture. The trade-off for reducing disclination and the resulting sparkle is a picture with virtually no horizontal sharpness at all. Picture detail and sharpness simply cannot be sacrificed in that fashion.

One skilled in the art would expect the sparkle artifact problem attributed to disclination to be addressed and ultimately solved in the imager as that is where the disclination occurs. However, in an emerging technology such as LCOS, there simply isn't an opportunity for parties other than the manufacturer of the LCOS imagers to fix the problem in the imagers. Moreover, there is no indication that an imager-based solution would be applicable to all LCOS imagers. Accordingly, there is an urgent need to provide a solution to this problem that can be implemented without modifying the LCOS imagers.

BRIEF SUMMARY OF THE INVENTION

The inventive arrangements taught herein solve the problem of sparkle in liquid crystal imagers attributed to disclination without degrading the high definition sharpness of the resulting display. Moreover, and absent an opportunity to address the problem by modification of imagers, the inventive arrangements advantageously solve the sparkle problem by modifying the video signal to be displayed, thus advantageously presenting a solution that can be applied to all liquid crystal imagers, including LCOS imagers. Any reduction in detail is advantageously and adjustably limited to dark scenes, even very dark scenes. The video signal is signal processed in such a way that higher brightness level information is advantageously unchanged, thus retaining high definition detail. At the same time, the lower brightness levels of the video signal that directly result in sparkle are processed in such a way that the sparkle is advantageously prevented altogether, or at least, is reduced to a level that cannot be perceived by a viewer. The signal processing of the lower brightness level information advantageously does not unacceptably degrade the detail of the high definition display. Moreover, signal processing in the form of slew rate limiting can advantageously be adjusted or calibrated in accordance with the non-linear gain of any gamma table, and thus, can be used with and adjustably fine tuned for different imagers in different video systems.

In a presently preferred embodiment, the luminance signal of a picture is decomposed twice into a higher brightness level signal and a lower brightness level signal. The demarcation between higher and lower brightness levels is adjustable and preferably related to the transition between the lower and higher gain portions of the gamma table. The lower brightness levels of the luminance signal are both low pass filtered and slew rate limited.

The lower brightness level signal is low pass filtered after the first decomposing to reduce the difference in brightness levels between adjacent pixels. The higher brightness level signal is delayed in time to match the processing delay through the low pass filter. The delay matched higher brightness level signal and the low pass filtered lower brightness level signal are then combined to form an intermediate luminance signal.

The intermediate luminance signal is decomposed into a higher brightness level signal and a lower brightness level signal. The demarcation between higher and lower brightness levels is also adjustable and also preferably related to the transition between the lower and higher gain portions of the gamma table. The lower brightness level signal is slew rate limited after the second decomposing to limit the difference in brightness levels between adjacent pixels. The higher brightness level signal is delayed in time to match the processing delay through the slew rate limiter. The delay matched higher brightness level signal and the slew rate limited lower brightness level signal are then combined to form a modified output luminance signal.

In a video display system the modified output luminance signal can be supplied to a color space converter, also referred to as a matrix, together with the R-Y and B-Y chrominance signals. The chrominance signals are also delayed to match the delay through the sparkle reduction circuit. The outputs of the color space converter are video drive signals, for example, R G B, supplied to the LCOS imager. The sparkle reduction processing changes the brightness levels of the pixels in the lowest brightness levels, corresponding to the highest gain portions of the gamma table, in such a way as to reduce the occurrence of declination in the LCOS imager.

A threshold for the luminance signal decomposer, for example, can be expressed as a digital fraction, for example a digital value of 60 out of a range of 255 digital steps (60/255), as would be present in an 8-bit signal. The threshold can also be expressed in IRE, which ranges from 0 to 100 in value, 100 IRE representing maximum brightness. The IRE level can be calculated by multiplying the digital fraction by 100. The IRE scale is a convenient way to normalize and compare brightness levels between signals having different numbers of bits.

The threshold values for the first and second decomposers, the frequency characteristic of the low pass filter and the positive negative slew rate limits can advantageously be selected independently of one another. This enables each one of the constituent components to be related to a different sub-portion of the higher gain portion of the gamma table. In this respect, the different values can nevertheless advantageously be selected with regard to one another to enable the constituent components to act together to provide an optimal result. The following values have been selected for the presently preferred embodiment: the threshold value for the first luminance decomposer is 60, corresponding to approximately 24 IRE for an 8-bit signal; the low pass filter has the frequency characteristic of a normalized 1:2:1 Z-transform; the threshold value for the second luminance decomposer is 10, corresponding to approximately 3.9 IRE for an 8-bit signal; and, the positive and negative slew rates are each limited to one digital value, corresponding to approximately 0.39 IRE for an 8-bit signal. In the presently preferred embodiment the frequency characteristic of the low pass filter is fixed and is not thereafter adjustable. Nevertheless, the frequency characteristic can advantageously be designed for optimized operation within the expected ranges of the selectable threshold values and the selectable slew rate limits.

A method for reducing sparkle artifacts in a liquid crystal imager, in accordance with the inventive arrangements, comprises the steps of: low pass filtering only a first lower brightness level signal component of a video signal; and, slew rate limiting only a second lower brightness level signal component of the video signal having the low pass filtered signal component, the video signal having the low pass filtered and the slew rate limited signal components being less likely to result in sparkle artifacts in the imager.

An apparatus for reducing sparkle artifacts in a liquid crystal imager, in accordance with the inventive arrangements, comprises: means for low pass filtering only a first lower brightness level signal component of a video signal; and, means for slew rate limiting only a second lower brightness level signal component of the video signal having the low pass filtered signal component, the video signal having the low pass filtered and the slew rate limited signal components being less likely to result in sparkle artifacts in the imager.

The inventive arrangements are presently embodied in a two-stage or tandem sparkle reduction process and in a two-stage or tandem sparkle reduction processor, as well as video display processing and a video display system. In each of these inventive arrangements, the low pass filtering preferably occurs in the first stage and the slew rate limiting occurs in the second stage. The low pass filtering preferably precedes the slew rate limiting. The use of the noted presently preferred values in the sparkle reduction processing of the video signal taught herein has been found to reduce the sparkle problem for specific, associated LCOS imagers by more than approximately 95%. It will be appreciated by those skilled in the art that other values would likely be selected to achieve optimum results with other liquid crystal imagers in other liquid crystal video display systems. At present, there is no formula for predicting or calculating optimum values in advance.

BRIEF DESCRIPTION OF THE DRAWINGS

FIG. 4 is a block diagram useful for explaining the operation of a delay matching circuit and a slew rate limiter in FIG. 1.

FIG. 5 is a block diagram of a portion of a video display system incorporating different combinations of sparkle reducing circuits.

DETAILED DESCRIPTION OF THE PREFERRED EMBODIMENTS

Figure 1:
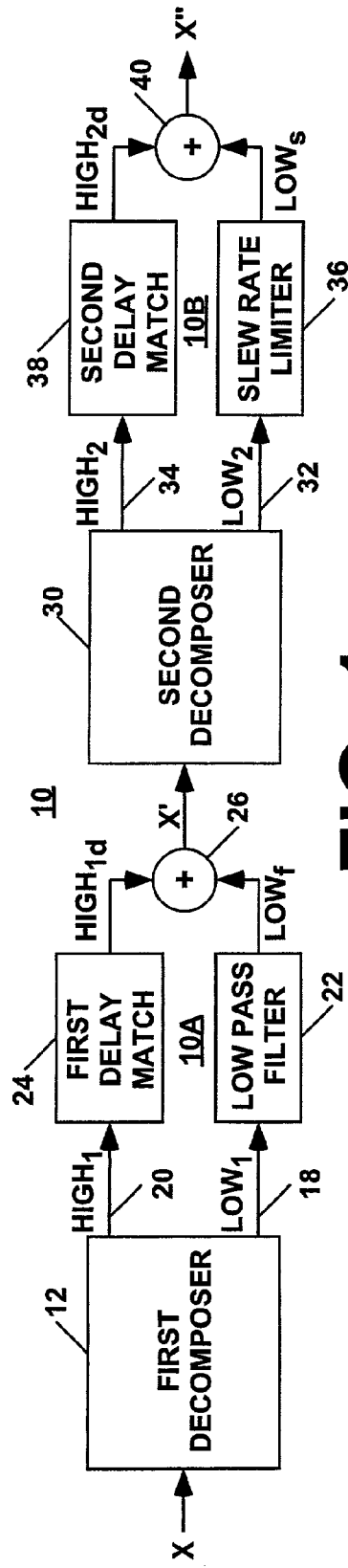
FIG. 1 is a block diagram of a sparkle reducing circuit in accordance with the inventive arrangements.

A circuit for reducing sparkle artifacts attributed to disclination errors in liquid crystal video systems, for example LCOS video systems, is shown in FIG. 1 and generally denoted by reference numeral 10. The circuit comprises a decomposer 12, a slew rate limiter 22, a delay match circuit 24 and an algebraic unit 26. An input video signal X, for example a luminance signal or a video drive signal, is modified by the circuit 10, and in response, an output video signal X' is generated. The video signal is a digital signal, and the waveform is a succession of digital samples representing brightness levels. The output signal X' has a similar digital format. The decomposer 12 generates a higher brightness level signal 20 and a lower brightness level signal 18. The operation of decomposer 12 is illustrated in FIG. 2.

Figure 2:
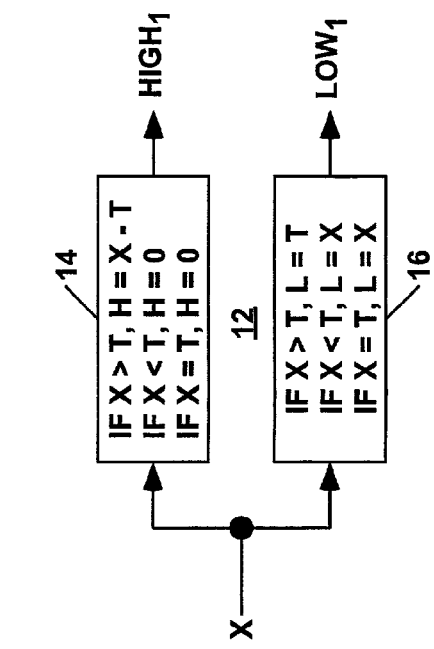
FIG. 2 is a block diagram useful for explaining the operation of decomposers in FIG. 1.

With reference to FIG. 2, a block 14 has a first set of rules for generating the higher brightness level signal. The input signal X represents a succession of brightness level samples defining a luminance input signal. The brightness level of each sample can be expressed numerically as a digital value or an IRE level, for example 60/255 or 24 IRE, as explained above. The letter T represents a threshold value, which can also be expressed as a digital value or an IRE level. If X is greater than T, then the brightness level H of the higher brightness level signal is equal to X minus T. If X is less than T, then the brightness level H of the higher brightness level signal is equal to 0. The output of block 14 is denoted $HIGH_1$ to distinguish from an output of a second decomposer 30.

A block 16 has a second set of rules for generating the lower brightness level signal. If X is greater than T, then the brightness level L of the lower brightness level signal is equal to the threshold T. If X is less than T, then the brightness level L of the lower brightness level signal is equal to X. The output of block 16 is denoted $LOW_1$ to distinguish from an output of the second decomposer 30.

It may be noted that when X=T, the output of block 14 will be the same whether X is defined as less than or equal to T, or X is defined as greater than or equal to T. In each case, H is equal to 0. It may also be noted that when X=T the output of block 16 will be the same whether X is defined as less than or equal to T, or X is defined as greater than or equal to T. In each case, L is equal to X.

Figure 3:
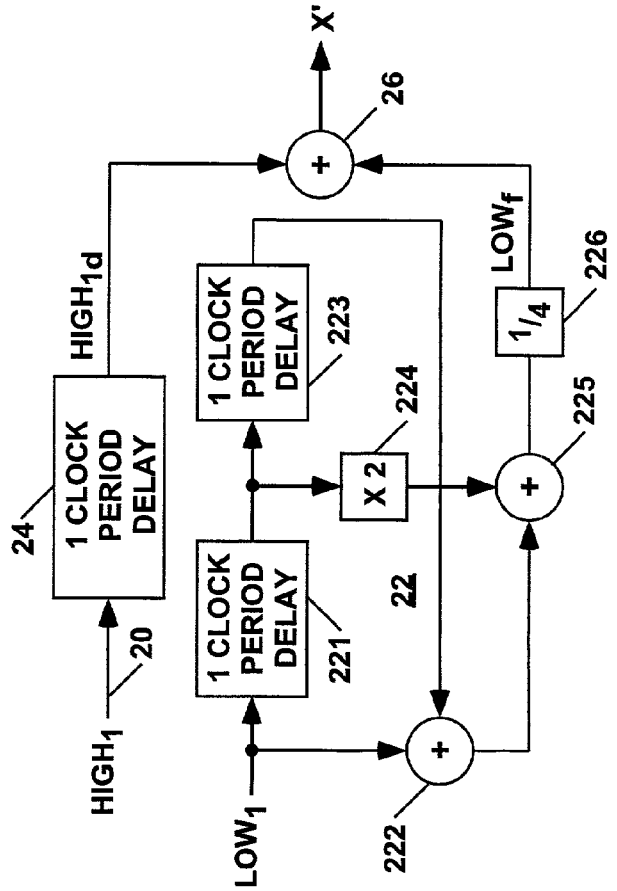
FIG. 3 is a block diagram useful for explaining the operation of a delay matching circuit and a low pass filter in FIG. 1.

Referring again to FIG. 1, the lower brightness level signal 18 is an input to the low pass filter 22. The higher brightness level signal 20 is an input to the delay match circuit 24. The details of the low pass filter 22 and the delay match circuit 24 are shown in FIG. 3. Low pass filter 22 is embodied as a normalized 1:2:1 Z-transform, which is also described by the formula $(1+2Z^{-1}+Z^{-2})/4$. The $LOW_1$ signal is an input to a first one-clock-period delay 221 and a first input to a summing algebraic unit 222. The output of the first one-clock-period delay is an input to a second one-clock-period delay 223 and a multiply-by-2 algebraic unit 224. The output of the second one-clock-period delay is a second input to the summing algebraic unit 222. The output of the summing algebraic unit 222 is a first input to a second summing algebraic unit 225. The output of the multiply-by-2 algebraic unit is a second input to the second summing algebraic unit 225. The output of the algebraic summing unit 225 is an input to a divide-by-4 algebraic unit 226. The output of the algebraic unit 226 is $LOW_f$.

The low pass filtering incurs a one clock period delay, and accordingly, the delay match circuit 24 provides a one-clock-period delay for the higher brightness level signal. The low pass filtered lower brightness level signal $LOW_f$, and the delayed higher brightness level signal $HIGH_{1d}$ are combined in summing algebraic unit 26, which generates the intermediate signal X'.

The second stage 10B comprises the second decomposer 30, a slew rate limiter 36, a second delay match circuit 38 and a second algebraic unit 40. The input signal X' is the intermediate signal generated by the first stage 10A. The output is a modified luminance signal X". The decomposer 30 generates a higher brightness level signal 34 and a lower brightness level signal 32. The operation of decomposer 30 is the same as explained in connection with decomposer 12 illustrated in FIG. 2. The same sets of rules apply, but as noted, the threshold value T need not be the same in decomposers 12 and 30. The outputs of blocks 14 and 16 are denoted $HIGH_2$ and $LOW_2$ to distinguish from the outputs of the first decomposer 12.

Referring again to FIG. 1, the lower brightness level signal $LOW_2$ on line 32 is an input to the slew rate limiter 36. The higher brightness level signal $HIGH_2$ on line 34 is an input to the delay match circuit 38. The details of the slew rate limiter 36 and the delay match circuit 38 are shown in FIG. 4. Slew rate limiter 36 assures that successive output signals from the slew rate limiter will not vary by more than the predetermined slew rate. The decomposed $LOW_2$ signal is an input to an algebraic unit 361. The other input to the algebraic unit 361 is the preceding output of the slew rate limiter stored in latch 372. The last output value $LOW_s$ is subtracted from the input value to determine the difference. The difference on output line 362 is an input to a first comparator 364 denoted MIN and a second comparator 365 denoted MAX. The difference is tested in the MIN circuit to see if the difference is greater than a positive slew limit S and is also tested in the MAX circuit to see if the difference is more negative than the negative slew limit −S. It is not necessary that the positive and negative slew limits have the same absolute value, although the same absolute value is used in the embodiment shown in FIG. 4.

The most significant bit (MSB) of the difference signal 362 is the control input to a multiplexer (MUX) 368. The most significant bit of the difference indicates the polarity of the difference and selects the output 366 of comparator 364 or the output 367 of comparator 365. The output of the MIN comparator is selected when the difference is positive and the output of the MAX comparator is selected when the difference is negative. The output of the multiplexer on line 369 is a slew rate limited difference that is added to the brightness level of the previous slew rate limited output pixel in algebraic unit 370, in order to generate the next new pixel. The output of the algebraic unit 370 on line 371 is stored in the latch 372. The LOW$_s$ output of the latch 372 is a stream of slew rate limited pixels. The embodiment of the slew rate limiter shown in FIG. 4 incurs a one-pixel delay, even if the slew rate is not limited. The clock signals are omitted from FIG. 4 for purposes of clarity.

Although the positive and negative slew rates in the example shown in FIG. 4 have the same absolute value, this need not be the case. Advantageously, the slew rates can be set independently for sample values greater than the preceding sample value and for sample values less than the preceding pixel value. If the positive and negative slew rates are equal to 1, for example, then successive outputs of the slew rate limiter will not differ from one another by more than 1 digital value step. If the LOW$_s$ signal has an 8-bit value, then successive outputs of the slew rate limiter will not differ from one another by more than one step out of 256 states, corresponding to approximately 0.39 IRE.

The one pixel delay of the slew rate limiter corresponds to a one clock period delay, and accordingly, the delay match circuit 38 provides a one-clock-period delay for the higher brightness level signal. It is possible under some circumstances that the delay incurred by the slew rate limiter can exceed a one-clock-period delay, but the delay match circuit need not be adjusted accordingly. The slew rate limited lower brightness level signal LOW$_s$ and the delayed higher brightness level signal HIGH$_{2d}$ are combined in the algebraic unit 40, which generates the output signal X".

The first and second lower brightness level signal components can advantageously be defined by selecting different brightness thresholds in accordance with transitions between lower and higher level gain portions of a gamma table associated with the LCOS imager. Slew rate limits can advantageously be selected in accordance with the lower and higher level gain portions of the gamma table. The response of different stages of the sparkle reduction processing, and processor, can therefore advantageously be adjusted in accordance with different sub-portions of the higher gain portion of the gamma table.

A video system 50 shown in FIG. 4 illustrates various combinations in which video signals, for example luminance signals and video drive signals, can be processed for sparkle reduction. A color space converter, or matrix, 52 generates video drive signals, for example RGB, responsive to a luminance signal, denoted LUMA, and chrominance signals, denoted CHROMA. The chrominance signals are more particularly designated R-Y and B-Y.

Two sets of inputs to the color space converter 52 are denoted 54A and 54B. In set 54A the LUMA signal input is modified by sparkle reduction processor (SRP) 10 to generate LUMA". The CHROMA signals are delayed by delay match (DM) circuits 56. The delay match is two clock periods, one for the first stage 10A and one for the second stage 10B. In set 54B the LUMA signal is not modified and the CHROMA signals are not delay matched.

Four sets of outputs from the color space converter 52 are denoted 60A, 60B, 60C and 60D. In set 60A the video drive signals RGB are not modified. In set 40B, each one of the RGB video drive signals is modified by a sparkle reduction processor 10 to generate R", G" and B". No delay matching is necessary. In set 60C only one of the video drive signals, for example G, is modified by sparkle reduction processor 10 to generate G". The remaining video drive signals are delayed by delay matching circuits 56. This delay match is also two-clock-periods. In set 60D only two of the video drive signals, for example R and G, are modified by sparkle reduction processors 10 to generate R" and G". The remaining video drive signal is delayed by delay matching circuit 56. Input set 54A can be used with any one of output sets 60A, 60B, 60C or 60D. Input set 54B can be used with any one of output sets 60B, 60C or 60D. The combination of input set 54B and output set 60A does not include sparkle reduction processing.

It has been found that using the combination of input set 54A and output set 60A reduces the sparkle artifact attributed to declination by more than approximately 95%. It should be remembered that the threshold values for each of the decomposers, the frequency characteristic of the filter and the slew rate limits can advantageously be independently selected. This enables the sparkle reduction processing to be fine tuned to different LCOS imagers in different video display systems.

The response of the first stage of circuit 10 in FIG. 1 to a specific input signal is illustrated in FIGS. 6(a) through 6(e). For purposes of illustration, the threshold T is set to the digital value or state of 60, corresponding to approximately 24 IRE for an 8-bit signal. The low pass filter operates according to the normalized 1:2:1 Z-transform. The response of the second stage of circuit 10 in FIG. 1 to the output of the first stage is illustrated in FIGS. 7(a) through 7(e). For purposes of illustration, the threshold T is set to the digital value or state of 10, corresponding to approximately 3.9 IRE for an 8-bit signal. For purposes of illustration, the positive and negative slew rates are each limited to one digital state or value, corresponding to approximately 0.39 IRE for an 8-bit signal.

Figure 6A:
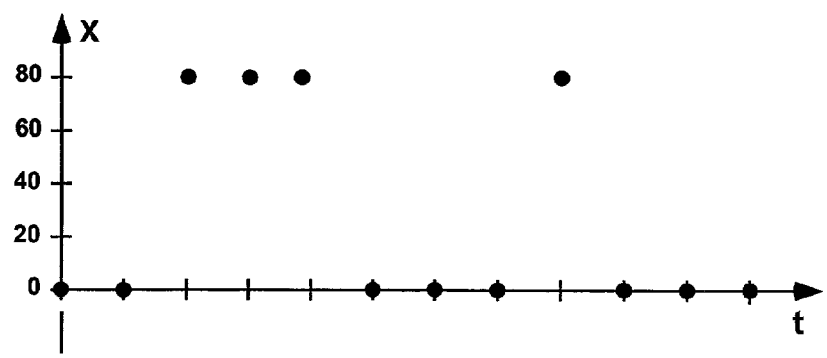
FIGS. 6(*a*)–6(*e*) are waveforms useful for explaining the operation of the first stage of the sparkle reducing circuit in FIG. 1.
Figure 6B:
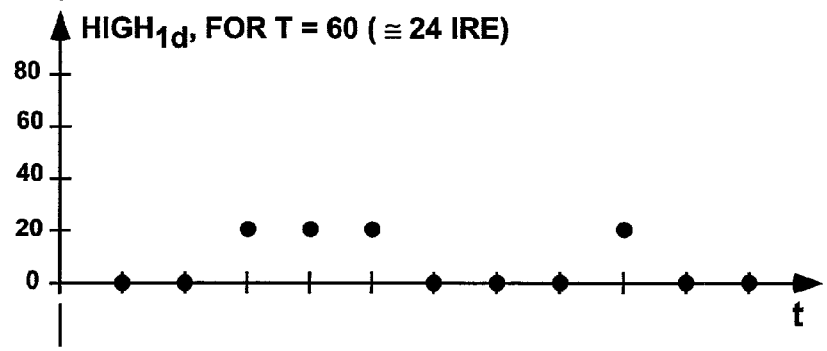
Figure 6C:
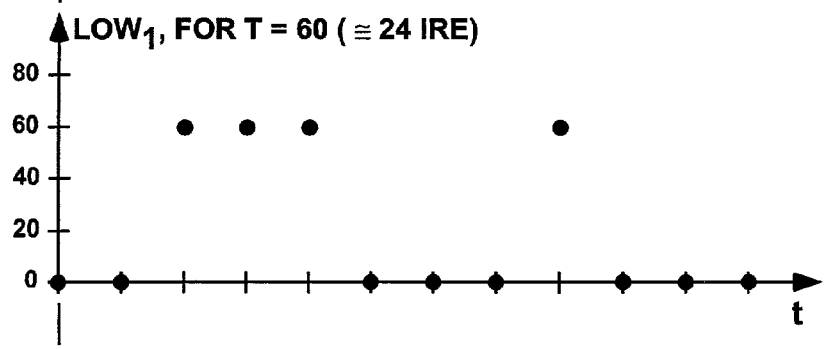
Figure 6D:
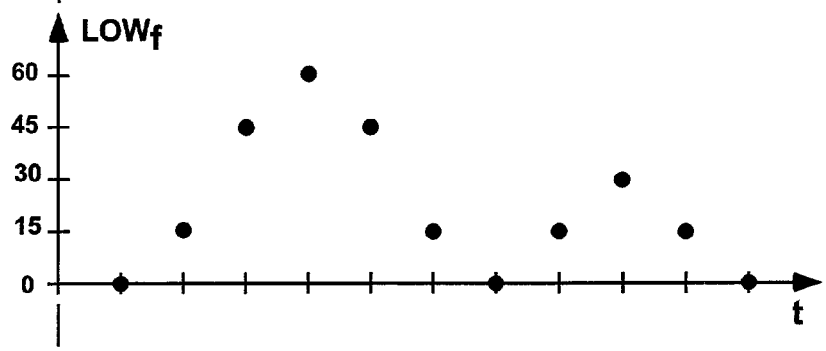
Figure 6E:
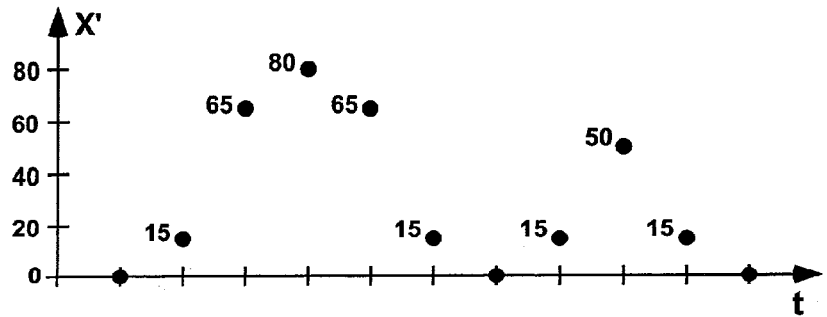
Figure 7A:
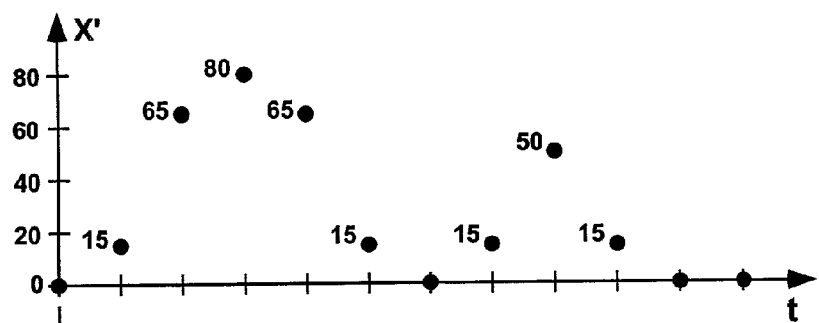
FIGS. 7(*a*)–7(*e*) are waveforms useful for explaining the operation of the second stage of the sparkle reducing circuit in FIG. 1.

It should be noted that the vertical scales for FIGS. 6(a) through 6(e) are not all the same. The value of the brightness level is equal to a clearly discernable value along the y-axis, except in FIG. 6(e), where each sample is also accompanied by its digital value. None of the y-axis scales is the same in FIGS. 7(a) through 7(e). The values for each sample are clearly discernable except in FIGS. 7(a) and 7(e), where each sample is also accompanied by its digital value. It should also be noted that FIGS. 6(e) and 7(a) are the same waveform.

In FIG. 6(a), stage 10A has an input signal X having the luminance values shown by the black dots. Each black dot represents a sample of a luminance value as an input to the decomposer 12. Each sample represents the brightness level of a pixel. The signal X can be seen as including a pulse followed by an impulse. The threshold value of T, as explained in connection with the rules of FIG. 2, is equal to 60 in this example.

The first two values of X are 0. In accordance with block 14, the value of the delay matched higher brightness level signal HIGH$_{1d}$ in FIG. 6(b) is 0 because X is less than T. The next three input values are 80. The corresponding levels of the higher brightness level signal in FIG. 6(b), which is the HIGH$_{1d}$ output of the delay match circuit, are 20 because the output value equals the input value minus the threshold value (X−T). The remaining sample values are calculated in the same fashion.

With reference to FIG. 6(c), the first two output values of the lower brightness level signal $LOW_1$ are 0, because the input is less than the threshold and the output equals the input. The next three output values are equal to 60 because the input value is greater than that threshold, and for $LOW_1$, the output equals the threshold value. The remaining samples are calculated in the same fashion.

FIG. 6(d) represents the output $LOW_f$ of low pass filter 22 responsive to the signal shown in FIG. 6(c). It can be noted that the pulse and impulse which are still evident in the waveform of FIG. 6(c) have been considerably smoothed, or rolled off, by the low pass filtering.

FIG. 6(e) is the intermediate signal X', which is the sum of the waveforms in FIGS. 6(b) and 6(d). The values of each sample other than 0 are noted. It can be seen from the waveform in FIG. 6(e) that the essential character of the pulse and of the impulse in the input waveform X been retained in the intermediate waveform X', but sharp edges or transitions between adjacent sample values have been advantageously reduced.

The response of the second stage 10B of circuit 10 in FIG. 1 to the intermediate waveform X' is illustrated in FIGS. 7(a) through 7(e). The threshold value of T for the second decomposer 30 is equal to 10, corresponding to approximately 3.9 IRE. The slew rate limits of the slew rate limiter 36 are set to 1 and to −1. Accordingly, successive output samples of the slew rate limiter cannot vary from one another by more than one digital state or step, approximately 0.39 IRE.

FIG. 7(a) illustrates the same intermediate waveform X' as in FIG. 6(e). The first value of X' is 0. In accordance with block 14, the value of the higher brightness level signal in FIG. 7(b), which is the output $HIGH_{2d}$ of the delay match circuit 38, is 0 because X is less than T. The next five input values are greater than the threshold T, so that each corresponding output value is calculated by subtracting 10 from the brightness level in FIG. 7(a). Where X' is 15, for example, $HIGH_2$ is 5. Where X' is 65, for example, $HIGH_2$ is 55. The following values of $HIGH_{2d}$ are 70, 55, 5, 0, 5, 40 and 5.

Figure 7B:
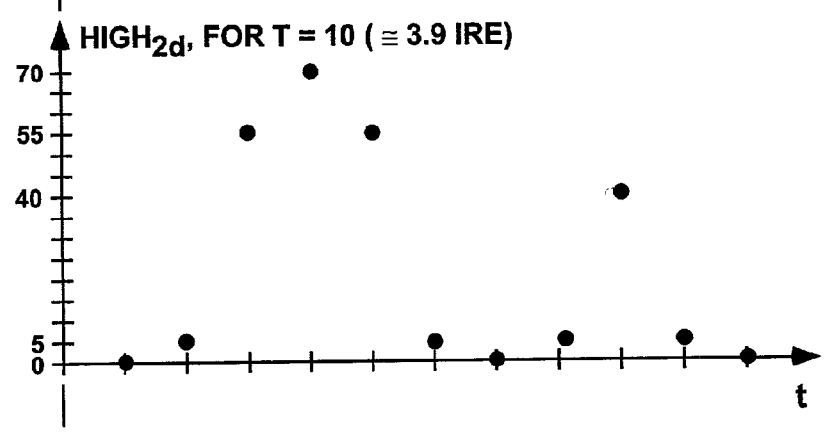
Figure 7C:
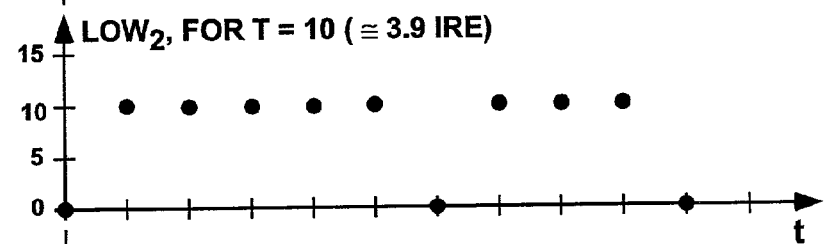

With reference to FIG. 7(c), the first output value of the lower brightness level signal $LOW_2$ is 0, because the input is less than the threshold and the output equals the input. The next five output values are equal to 10 because the input value is greater than the threshold, so the output equals the threshold value. The remaining samples are calculated in the same fashion.

Figure 7D:
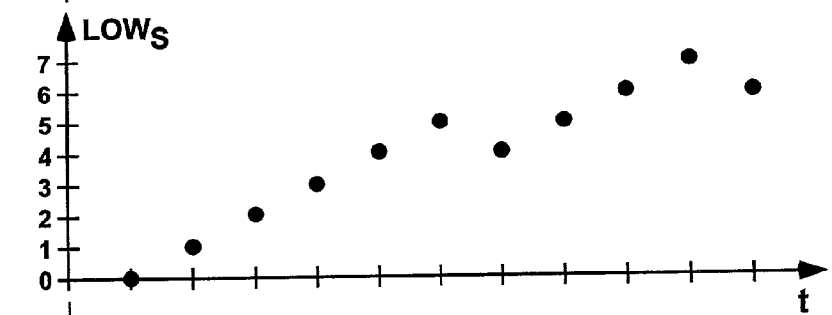

FIG. 7(d) represents the output $LOW_s$ of slew rate limiter 36 responsive to the signal shown in FIG. 7(c). The value of the first sample of $LOW_2$ is 0. Since 0 is less than 1, the values of the first samples of $LOW_s$ is 0. The value of the second sample of $LOW_2$ is 10. Since 10 exceeds 0 by more than the slew limit of 1, the value of the second sample of $LOW_s$ is 1. The value of the third sample of $LOW_2$ is 10. Since 10 exceeds 1 by more than the slew limit of 1, the value of the third sample of $LOW_s$ is 2. The value of the fourth sample of $LOW_2$ is 10. Since 10 exceeds 2 by more than the slew limit of 1, the value of the fourth sample of $LOW_s$ is 3. The value of the fifth sample of $LOW_2$ is 10. Since 10 exceeds 3 by more than the slew limit of 1, the value of the fifth sample of $LOW_s$ is 4. The value of the sixth sample of $LOW_2$ is 10. Since 10 exceeds 4 by more than the slew limit of 1, the value of the sixth sample of $LOW_s$ is 5. The value of the seventh sample of $LOW_2$ is 0. Since 0 is less than 5 by more than the slew limit of 1, the value of the seventh sample of $LOW_s$ is 4. The value of the eighth sample of $LOW_2$ is 10. Since 10 exceeds 4 by more than the slew limit of 1, the value of the eighth sample of $LOW_s$ is 5. The value of the ninth sample of $LOW_2$ is 10. Since 10 exceeds 5 by more than the slew limit of 1, the value of the ninth sample of $LOW_s$ is 6. The remaining values can be calculated in a similar manner. The effect of the slew rate limiting on smoothing or rolling off the slopes and transitions of the waveform in FIG. 7(c) is evident.

Figure 7E:
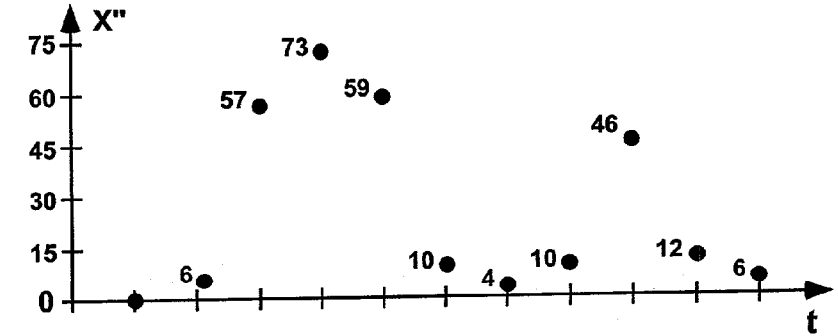

Finally, FIG. 7(e) is the output signal X", which is the sum of the waveforms in FIGS. 7(b) and 7(d). It can be noted from the waveform in FIG. 7(e) that the essential character of the pulse and of the impulse in the input waveform X been retained in the output waveform X" after the tandem processing, but sharp edges or transitions between adjacent sample values have been advantageously reduced. The maximum amplitudes of the pulse and impulse have also been advantageously reduced, and there are a smaller number of zero values as well. Only the very dark areas of the picture are noticeably affected by the sparkle reduction processing, as evidenced by the very low IRE values of the decomposer thresholds and the slew rate limits. Accordingly, the high definition horizontal resolution is advantageously maintained.

The methods and apparatus illustrated herein teach how the brightness levels of adjacent pixels can be restricted or limited in the horizontal direction, and indeed, these methods and apparatus solve the sparkle problem. Nevertheless, these methods and apparatus can also be extended to restricting or limiting brightness levels of adjacent pixels in the vertical direction, or in both the horizontal and vertical directions.

What is claimed is:

1. A method for reducing sparkle artifacts due to non linearity in a transfer function of a liquid crystal imager comprising the steps of:
    decomposing an input video signal according to a first threshold to provide a first low brightness signal;
    low pass filtering said first low brightness signal to provide a low pass filtered low brightness signal;
    slew rate limiting said low pass filtered low brightness signal; and
    said providing an output video signal including said low pass filtered slew rate limited signal, said output video signal being less likely to result in sparkle artifacts in said imager.

2. The method of claim 1 wherein said decomposing step provides a first high brightness signal according to said first threshold, the method comprising the step of
    combining said low pass filtered first brightness signal and said high brightness signal prior to said slew rate limiting.

3. The method of claim 2 comprising the step of delay matching said first high brightness signal with said low pass filtered low brightness signal prior to said combining step.

4. The method of claim 2 comprising the steps of:
    decomposing said combined signal into a second low brightness signal and a high brightness signal according to a second threshold prior to said slew rate limiting;
    applying said slew rate limiting step to said second low brightness signal; and,
    combining said slew rate limited second low brightness signal and said second high brightness signal to generate said output video signal.

5. The method of claim 4 comprising the step of delay matching said second high brightness signal with said slew rate limited low brightness signal prior to said combining step.

6. The method of claim 1 comprising the step of supplying said output video signal to a liquid crystal on silicon imager.

7. The method of claim 1 comprising the steps of:
applying said sparkle reducing steps to an input video signal comprising a luminance signal for a picture;
delaying chrominance signals for said picture; and,
generating a plurality of video drive signals from said processed luminance signal and said delayed chrominance signals.

8. The method of claim 7 comprising the steps of:
applying said sparkle reducing steps to further process at least one of said video drive signals; and,
delaying non-sparkle-reduced video drive signals.

9. The method of claim 1 comprising the steps of:
generating a plurality of video drive signals from luminance and chrominance signals;
applying said sparkle reducing steps to at least one of said video drive signals; and,
delaying non-sparkle-reduced video drive signals.

10. The method of claim 4 comprising the steps of:
selecting said first and second thresholds in accordance with transitions of a gamma table associated with said LCOS imager; and,
selecting slew rate limits in accordance with the gain of said gamma table.

11. An apparatus for reducing sparkle artifacts due to non linearity in a transfer function of a liquid crystal imager comprising:
means for decomposing an input video signal according to a first threshold to provide a first low brightness signal;
means for low pass filtering said first low brightness signal to provide a low pass filtered low brightness signal;
means for slew rate limiting said low pass filtered low brightness signal; and
means for providing an output video signal including said low pass filtered slew rate limited signal to said imager.

12. The apparatus of claim 11 wherein said decomposer provides a first high brightness signal in accordance with said first threshold, said apparatus comprising;
first means for combining said low pass filtered low brightness signal and said first high brightness signal prior to said slew rate limiting;
means for dividing said combined signal into a second low brightness signal and a second high brightness signal prior to said slew rate limiting; and,
second means for combining said slew rate limited second low brightness signal and said second high brightness signal to generate said output video signal.

13. The apparatus of claim 12 comprising:
means for delay matching said first high brightness signal with said low pass filtered low brightness signal; and,
means for delay matching said second high brightness signal with said slew rate limited second low brightness signal.

14. The apparatus of claim 11 wherein a picture to be displayed on said imager includes luminance signals comprising said input signal and chrominance signals, the apparatus comprising:
means for delaying said chrominance signals for said picture; and,
means for generating a plurality of video drive signals based upon said output video signal and said delayed chrominance signals.

15. The apparatus of claim 11 wherein:
said first and second thresholds are selectable in accordance with transitions between lower and higher gain portions of a gamma table associated with said imager; and,
slew rate limits are selectable in accordance with the gain of said gamma table.

16. The apparatus of claim 11 wherein said means for low pass filtering has a normalized 1:2:1 Z-transform frequency characteristic.

17. The apparatus of claim 11 wherein said imager comprises a liquid crystal on silicon imager.

18. An apparatus for reducing sparkle artifacts due to non linearity in a transfer function of a liquid crystal imager comprising:
a decomposer for providing a first low brightness signal in accordance with a first threshold;
a low pass filter for filtering said first low brightness signal to provide a filtered low brightness signal; and,
a slew rate limiter for processing said filtered low brightness signal to provide an output video signal less likely to result in sparkle artifacts in said imager.

19. The apparatus of claim 18 wherein said
first decomposer provides a first high brightness signal according to said first threshold said apparatus comprising:
a first algebraic unit for combining said low pass filtered low brightness signal and said first high brightness signal prior to processing by said slew rate limiter;
a second decomposer for dividing said combined signals in accordance with a second threshold into a second low brightness signal and a second high brightness signal prior to processing by said slew rate limiter; and,
a second algebraic unit for combining said slew rate limited second low brightness signal and said second high brightness signal to generate said output video signal.

20. The apparatus of claim 19 comprising:
a first delay match circuit for delaying said first high brightness signal prior to said combining with said low pass filtered first low brightness signal; and,
a second delay match circuit for delaying said second high brightness signal prior to said combining with said slew rate limited second low brightness signal.

21. The apparatus of claim 20 wherein a picture to be displayed on said imager comprises a luminance and chrominance signal and said input signal comprises said luminance signal the apparatus comprising:
a delay matching circuit for delaying chrominance signal; and,
a color space converter for generating a plurality of video drive signals based upon said output signal and said delayed chrominance signals.

22. The apparatus of claim 18 wherein said first and second brightness thresholds are selectable in accordance with transitions between relatively lower and higher gain portions of a gamma table associated with said imager and slew rate limits are selectable in accordance the gain of said gamma table.

23. The apparatus of claim 20 wherein said low pass filter has a normalized 1:2:1 Z-transform frequency characteristic.

24. The apparatus of claim 20 wherein said imager comprises a liquid crystal on silicon imager.

* * * * *